US012505784B2

(12) United States Patent
Wang et al.

(10) Patent No.: US 12,505,784 B2
(45) Date of Patent: Dec. 23, 2025

(54) SCREEN CONTROL METHOD AND APPARATUS, DISPLAY APPARATUS, DEVICE AND MEDIUM

(71) Applicant: BOE Technology Group Co., Ltd., Beijing (CN)

(72) Inventors: Xian Wang, Beijing (CN); Ran Duan, Beijing (CN); Yanhong Wu, Beijing (CN); Youxiang Xia, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 99 days.

(21) Appl. No.: 18/021,927

(22) PCT Filed: Apr. 29, 2022

(86) PCT No.: PCT/CN2022/090631

§ 371 (c)(1),
(2) Date: Feb. 17, 2023

(87) PCT Pub. No.: WO2023/206513

PCT Pub. Date: Nov. 2, 2023

(65) Prior Publication Data

US 2024/0249664 A1 Jul. 25, 2024

(51) Int. Cl.
*G09G 3/32* (2016.01)
*G09G 3/00* (2006.01)
*G09G 3/20* (2006.01)

(52) U.S. Cl.
CPC ............... *G09G 3/32* (2013.01); *G09G 3/006* (2013.01); *G09G 3/2007* (2013.01); *G09G 3/2092* (2013.01); *G09G 2320/0257* (2013.01); *G09G 2320/041* (2013.01); *G09G 2320/0666* (2013.01); *G09G 2330/12* (2013.01)

(58) Field of Classification Search
None
See application file for complete search history.

(56) References Cited

U.S. PATENT DOCUMENTS

| | | | | |
|---|---|---|---|---|
| 9,618,789 | B2 * | 4/2017 | Kimura | H05B 45/22 |
| 11,682,346 | B2 * | 6/2023 | Lai | G01R 31/26 345/690 |
| 2007/0064421 | A1 | 3/2007 | Baba | |
| 2020/0090604 | A1 * | 3/2020 | Chen | G09G 3/36 |
| 2021/0027726 | A1 * | 1/2021 | Lee | H04N 9/3182 |

(Continued)

FOREIGN PATENT DOCUMENTS

| | | | |
|---|---|---|---|
| CN | 1937010 | A | 3/2007 |
| CN | 110021268 | A | 7/2019 |

(Continued)

*Primary Examiner* — Fred Tzeng
(74) *Attorney, Agent, or Firm* — WHDA, LLP

(57) ABSTRACT

The present disclosure provides a screen control method and apparatus, a display apparatus, a device and a medium, which belongs to the technical field of display screens. The method is applied to a controller of a Mini LED screen, and includes the following steps: acquiring a temperature and a gray scale of the screen; confirming that there is a sticking image on the screen when the temperature exceeds a stable temperature range corresponding to the gray scale; and controlling the screen to adjust the red-pixel value according to the temperature to eliminate the sticking image.

12 Claims, 7 Drawing Sheets

(56) References Cited

U.S. PATENT DOCUMENTS

| | | | | |
|---|---|---|---|---|
| 2023/0137579 | A1 | 5/2023 | Wu | |
| 2023/0206816 | A1* | 6/2023 | Wu | G09G 3/3208 345/204 |
| 2023/0267870 | A1* | 8/2023 | Hsieh | G09G 3/2074 345/690 |

FOREIGN PATENT DOCUMENTS

| | | | |
|---|---|---|---|
| CN | 113270070 | A | 8/2021 |
| CN | 114120887 | A | 3/2022 |
| JP | H07-226536 | A | 8/1995 |

* cited by examiner

SCREEN CONTROL METHOD AND APPARATUS, DISPLAY APPARATUS, DEVICE AND MEDIUM

TECHNICAL FIELD

The present disclosure belongs to the technical field of display screens and, more particularly, to a screen control method and apparatus, a display apparatus, a device and a medium.

BACKGROUND

A Mini LED refers to an LED with a package size of 0.1 mm to 0.2 mm, which is also known as a mini light-emitting diode. Due to a size of the Mini LED being on an order of 100 micrometers and the absence of the need to overcome technological barriers of mass transferring, it is feasible to be mass-produced and may be used as a light-emitting component of a large-size screen composed of and spliced by a plurality of screens.

SUMMARY

A screen control method and apparatus, a display apparatus, a device and a medium are provided in the present disclosure.

A screen control method applied to a controller of a Mini LED screen is provided in the present disclosure, which includes:

acquiring a temperature and a gray scale of the screen;

confirming that there is a sticking image on the screen when the temperature exceeds a stable temperature range corresponding to the gray scale; and controlling the screen to adjust the red-pixel value according to the temperature to eliminate the sticking image.

Optionally, the step of controlling the screen to compensate values of red pixel points according to the temperature includes:

calculating a temperature variation amount according to the temperature and the stable temperature range;

querying a red-pixel compensation amount corresponding to the temperature variation amount in a red-pixel compensation amount corresponding relationship corresponding to the gray scale; and controlling the screen to adjust the red-pixel value of a pixel point according to the red-pixel compensation amount.

Optionally, the temperature includes: area temperatures of different screen areas in the screen; and the step of controlling the screen to adjust the red-pixel value of the pixel point according to the red-pixel compensation amount includes:

calculating the red-pixel compensation amount of each pixel point in the screen area according to a temperature diffusion coefficient; and adjusting the red-pixel value of each pixel point according to the corresponding red-pixel compensation amount.

Optionally, the step of confirming that there is the sticking image on the screen when the temperature exceeds the stable temperature range corresponding to the gray scale includes:

acquiring area temperatures of different screen areas in the screen, and calculating area average gray scales of the different screen areas;

querying a stable temperature range corresponding to the area average gray scale of each of the screen areas; and confirming that there is the sticking image in the screen area corresponding to the area temperature when the area temperature exceeds the stable temperature range corresponding to the area average gray scale.

Optionally, the temperature includes: pixel point temperatures of different pixel points in the screen; and the step of controlling the screen to adjust the red-pixel value of the pixel point according to the red-pixel compensation amount includes:

adjusting the red-pixel value of each pixel point according to the red-pixel compensation amount corresponding to the pixel point temperature.

Optionally, the step of confirming that there is the sticking image on the screen when the temperature exceeds the stable temperature range corresponding to the gray scale includes:

calculating pixel point temperatures of different pixel points in the screen according to the temperature and temperature diffusion coefficient;

querying a stable temperature range corresponding to a pixel gray scale of each of the pixel points; and confirming that the pixel point corresponding to the pixel point temperature has a sticking image when the pixel point temperature exceeds the stable temperature range corresponding to the pixel gray scale.

Optionally, the red-pixel compensation amount corresponding relationship is obtained by following steps:

adjusting the screen in an adjustable gray scale range;

adjusting the red-pixel value of the screen to eliminate the sticking image when sticking image occurs on the screen;

recording a gray scale and a temperature variation amount when the sticking image occurs on the screen and the red-pixel compensation amount for performing eliminating the sticking image to the screen; and establishing a corresponding relationship between the temperature variation amount and the red-pixel compensation amount to obtain the red-pixel compensation amount corresponding relationship corresponding to the gray scale.

Optionally, the temperature diffusion coefficient is obtained by following steps:

when the screen includes a plurality of splicing screens, a reference temperature diffusion coefficient is adjusted according to a positional relationship between different splicing screens and a size of a splicing gap so as to obtain a temperature diffusion coefficient of each splicing screen, and the reference temperature diffusion coefficient is a temperature diffusion coefficient when the splicing screens are not spliced.

A screen control apparatus applied to a controller of a Mini LED screen is provided in the present disclosure which includes:

an acquisition module configured to acquire a temperature and a gray scale of the screen;

an identification module configured to confirm that there is a sticking image on the screen when the temperature exceeds a stable temperature range corresponding to the gray scale; and a control module configured to control the screen to adjust a red-pixel value according to the temperature to eliminate the sticking image.

Optionally, the control module is further configured for:

calculating a temperature variation amount according to the temperature and the stable temperature range;

querying a red-pixel compensation amount corresponding to the temperature variation amount in a red-pixel compensation amount corresponding relationship corresponding to the gray scale; and controlling the screen to adjust the red-pixel value of a pixel point according to the red-pixel compensation amount.

Optionally, the temperature includes: area temperatures of different screen areas in the screen; and the control module is further configured for:

calculating the red-pixel compensation amount of each pixel point in the screen area according to a temperature diffusion coefficient; and adjusting the red-pixel value of each pixel point according to the corresponding red-pixel compensation amount.

Optionally, the identification module is further configured for:

acquiring area temperatures of different screen areas in the screen, and calculating area average gray scales of the different screen areas;

querying a stable temperature range corresponding to the area average gray scale of each of the screen areas; and confirming that there is the sticking image in the screen area corresponding to the area temperature when the area temperature exceeds the stable temperature range corresponding to the area average gray scale.

Optionally, the temperature includes: pixel point temperatures of different pixel points in the screen; and the control module is further configured for:

adjusting the red-pixel value of each pixel point according to the red-pixel compensation amount corresponding to the pixel point temperature.

Optionally, the identification module is further configured for:

calculating pixel point temperatures of different pixel points in the screen according to the temperature and temperature diffusion coefficient;

querying a stable temperature range corresponding to a pixel gray scale of each of the pixel points; and confirming that the pixel point corresponding to the pixel point temperature has a sticking image when the pixel point temperature exceeds the stable temperature range corresponding to the pixel gray scale.

Optionally, the red-pixel compensation amount corresponding relationship is obtained by following steps:

adjusting the screen in an adjustable gray scale range;

adjusting the red-pixel value of the screen to eliminate the sticking image when sticking image occurs on the screen;

recording a gray scale and a temperature variation amount when the sticking image occurs on the screen and the red-pixel compensation amount for performing eliminating the sticking image to the screen; and establishing a corresponding relationship between the temperature variation amount and the red-pixel compensation amount to obtain the red-pixel compensation amount corresponding relationship corresponding to the gray scale.

Optionally, the temperature diffusion coefficient is obtained by following steps:

when the screen includes a plurality of splicing screens, a reference temperature diffusion coefficient is adjusted according to a positional relationship between different splicing screens and a size of a splicing gap so as to obtain a temperature diffusion coefficient of each splicing screen, and the reference temperature diffusion coefficient is a temperature diffusion coefficient when the splicing screens are not spliced.

A display apparatus is provided in the present disclosure, including: a display panel and a controller;

wherein the display panel is provided with a temperature sensor, and the temperature sensor is configured for sending a temperature of the display panel to the controller; and the controller is configured for executing the screen control method according to any one of claims 1 to 8.

A computing processing device is provided in the present disclosure, including:

a memory with a computer-readable code stored therein;

one or more processors, the computing processing device executing the screen control method stated above when the computer-readable code is executed by the one or more processors.

A computer program is provided in the present disclosure, including a computer-readable code, which, when executed on a computing processing device, causes the computing processing device to execute the screen control method stated above.

A non-transient computer-readable medium with a computer program of the screen control method stated above stored therein.

The above description is merely a summary of the technical solutions of the present disclosure. In order to more clearly know the elements of the present disclosure to enable the implementation according to the contents of the description, and in order to make the above and other purposes, features and advantages of the present disclosure more apparent and understandable, the particular embodiments of the present disclosure are provided below.

BRIEF DESCRIPTION OF THE DRAWINGS

In order to explain embodiments of the present disclosure or the technical scheme in the prior art more clearly, the drawings required in the description of the embodiments or the prior art will be briefly introduced below; obviously, the drawings in the following description are some embodiments of the present disclosure, and other drawings may be obtained according to these drawings by those of ordinary skill in the art without paying creative labor.

DETAILED DESCRIPTION OF THE EMBODIMENTS

In order to make the objects, the technical solutions, and the advantages of the present disclosure clearer, the technical solutions of the embodiments of the present application will be clearly and completely described below with reference to the drawings of the embodiments of the present application. Apparently, the described embodiments are merely certain embodiments of the present application, rather than all of the embodiments. All of the other embodiments that a person skilled in the art obtains on the basis of the embodiments of the present application without paying creative work fall within the protection scope of the present application.

A Mini LED refers to an LED with a package size of 0.1 mm to 0.2 mm, which is also known as a mini light-emitting diode. Due to a size of the Mini LED being on an order of 100 micrometers and the absence of the need to overcome technological barriers of mass transferring, it is feasible to be mass-produced and may be used as a light-emitting component of a large-size screen composed of and spliced by a plurality of screens.

In related art, most of products using Mini LEDs are driven by a PM (Passive Matrix), that is, cathodes and anodes are formed in a matrix and pixel points in an array are lit in a scanning manner. A current driven by PM is at an mA level, and brightness may decrease by 5% when the temperature rises by 10° C. With a small-pitch brightness change of 400 nit, a display screen basically has no sticking image. For a Mini LED driven by an AM (Active Matrix) and under a uA-level current, luminous efficiency of red pixel points may decrease sharply with increase of temperature, that is, brightness of the red pixel points may decrease by more than 12% with the increase of temperature by 10° C., which leads to obvious differences in the brightness of the red pixel points in different areas on the screen which display high gray scales and low gray scales for a long time.

Specifically, it is found in researches that red-light attenuation of a Mini LED screen is strongly related to temperature. The higher the temperature, the more obvious the red-light attenuation and the more color deviation towards cyan the picture. However, at a low temperature, the red-light attenuation is weak and the picture does not appear color deviation towards cyan, which is subjectively towards red than the towards cyan pixel points. When at least two different areas of the screen have great differences in displayed gray scales and then these two areas of the screen are switched to display a same gray scale, there may be a red-cyan interlaced sticking image on a whole screen due to uneven brightness of red pixel points in different areas of the screen, which seriously affects display effect of the screen.

Figure 1:
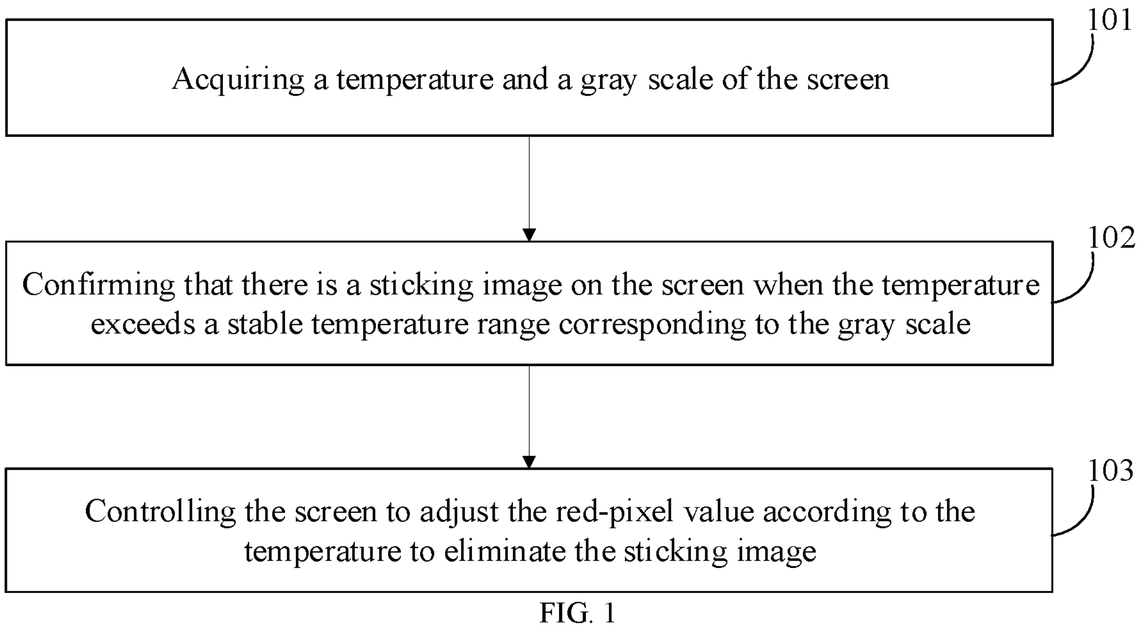
FIG. 1 schematically shows a flow chart of a screen control method according to some embodiments of the present disclosure.

FIG. 1 schematically shows a flow chart of a screen control method according to the present disclosure, which is applied to a controller of a Mini LED screen, and the method includes steps 101 to 103.

In the step 101, a temperature and a gray scale of a screen are acquired.

It should be noted that an execution subject of the present disclosure is a controller that drives a Mini LED screen by AM, and is configured for executing steps of the screen control method according to some embodiments of the present disclosure.

In the embodiment of the present disclosure, the controller can obtain a gray scale displayed on the screen by analyzing an image signal output to the screen, and the temperature of the screen may be collected by a temperature sensor disposed on the screen and sent to the controller, or may be monitored by an infrared camera and sent to the controller. Specifically, when the temperature of the screen is a temperature obtained by the temperature sensor disposed on the screen, a plurality of temperature sensors may be disposed on the screen according to a screen size. The more the temperature sensors are disposed, the higher a disposed density is, and the more accurate a collected temperature of the screen is. Of course, as long as a real-time temperature of the screen may be obtained with a manner, the manner may be applied to an embodiment of the present disclosure, and a specific acquisition method of the temperature of the screen may be set according to actual needs, which is not limited herein.

In the step 102, when the temperature exceeds a stable temperature range corresponding to the gray scale, it is confirmed that there is a sticking image on the screen.

In the embodiment of the present disclosure, considering that temperatures of the Mini LED screen under different gray scales are different, under different gray scales, temperatures at which brightness of pixel points in the Mini LED screen is stable and there is no sticking image are different. Further, considering that the temperature is usually not maintained at a constant value, in the present disclosure, a range around a stable temperature is taken when images with different gray scales are displayed by the Mini LED, so as to characterize whether brightness of respective pixel points in the Mini LED screen is stable. For example, if the stable temperature is 42° C. at a certain gray scale, and a stable temperature range may be taken to be from (42−0.2° C.) to (42+0.2° C.), or if the stable temperature range is 36° C., and the stable temperature range may be taken to be from (36−0.5° C.) to (36+0.5° C.), which may be specifically set according to actual needs and not limited herein.

Specifically, if a temperature of a pixel point in the screen is higher than the stable temperature range, it indicates that red brightness attenuation of the pixel point is greater than that of other pixel points, so that it is towards cyan over other pixel points, resulting in sticking images in the screen displaying. On the contrary, if the temperature of a pixel point in the screen is lower than the stable temperature range, it indicates that red brightness attenuation of the pixel point is smaller than that of other pixel points, so that it is towards red over other pixel points, which will also lead to sticking images in the screen displaying. It may be seen that no matter the temperature of the Mini LED screen is higher or lower than the stable temperature range, red brightness of the pixel points in the screen is not uniform, which makes the screen partially towards cyan and partially towards red, resulting in sticking image.

In the step 103, the screen is controlled to adjust a red-pixel value according to the temperature to eliminate the sticking image.

In the embodiment of the present disclosure, in accordance with a law that red-light brightness of the pixel points of the Mini LED screen driven by the AM is obviously influenced by the temperature, and the higher the temperature, the greater the red-light brightness attenuation in the above description, the red-light brightness attenuation of the pixel points is determined according to the temperature of adjusting to the screen in the present disclosure, so that by adjusting red-pixel values of a picture displayed on the screen in time according to adjusting to the attenuation, the red-light brightness of pixel points in the screen is unified so as to eliminate the sticking image in the screen.

Specifically, considering that the sticking image exists in the Mini LED screen because the red-light brightness of some of the pixel points is relatively high or low, a red-pixel value of a pixel point with low red-light brightness may be raised, or red-pixel values of other pixel points except the pixel point with the low red-light brightness may be lowered, or a red-pixel value of a pixel point with high red-light brightness may be lowered, or red-pixel values of other pixel points except those with high red-light brightness may be raised. These manners can adjust red-light brightness of the pixel points in the screen to uniform brightness so as to eliminate the sticking image in the screen, and a specific adjustment method may be set according to actual needs, which is not limited herein.

According to the embodiment of the present disclosure, it is identified whether there is a sticking image caused by red-light attenuation of pixel points in the screen according to whether a temperature of the Mini LED screen exceeds a stable temperature range corresponding to a displayed gray scale, and the red-light brightness is adjusted by adjusting the red-pixel values of the pixel points in the screen according to the temperature when the temperature of the screen exceeds the stable temperature range, so that the red-light brightness of the pixel points in the screen may be kept uniform so as to eliminate the sticking image in the screen.

Figure 2:
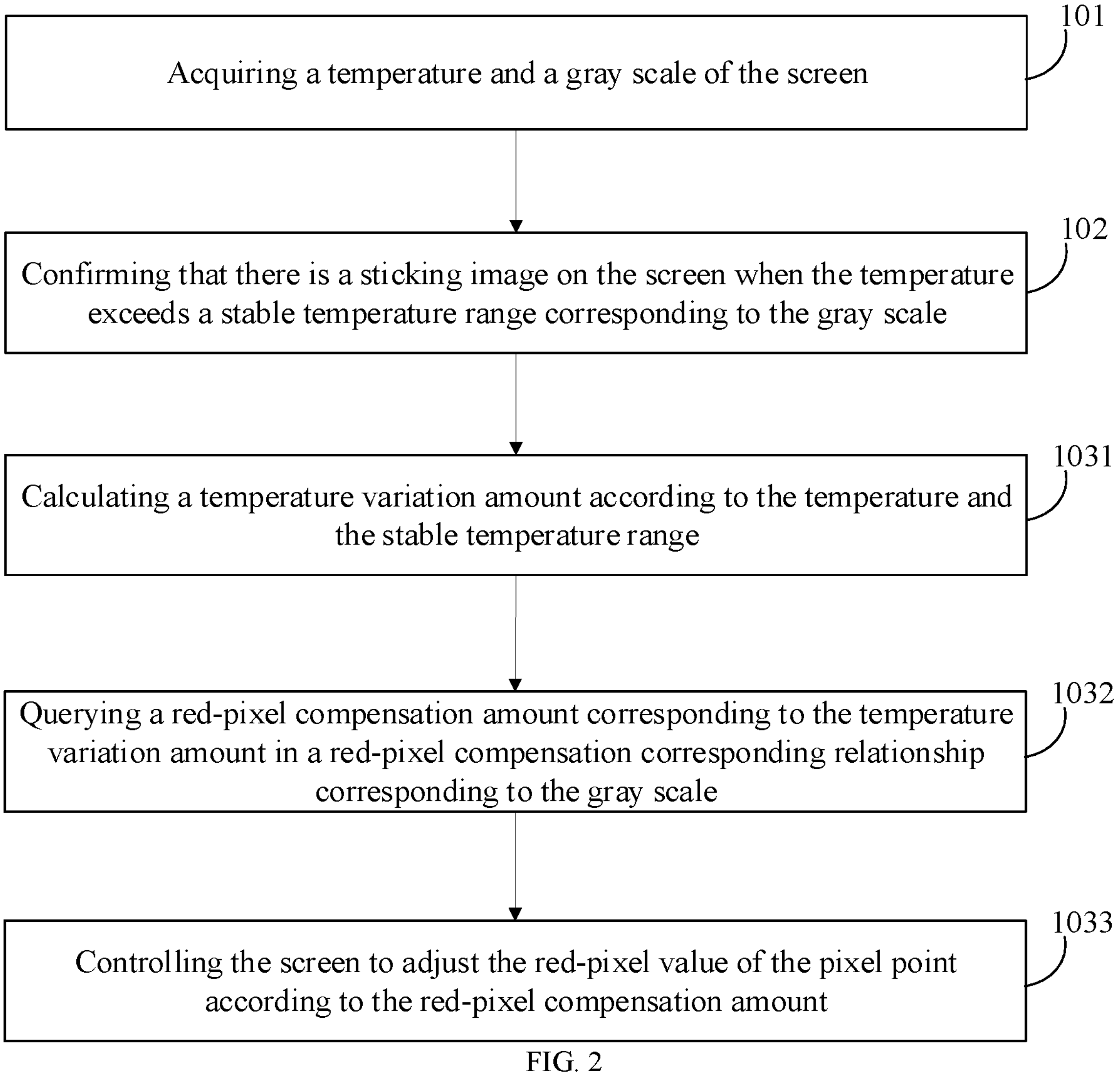
FIG. 2 schematically shows a flow chart of another screen control method according to some embodiments of the present disclosure.

Optionally, referring to FIG. 2, the step 103 includes steps 1031 and 1032.

In the step 1031, a temperature variation amount is calculated according to the temperature and the stable temperature range.

In the embodiment of the present disclosure, the temperature variation amount may be an excess of the screen temperature beyond the stable temperature range, or a numerical distance between a center temperature of the stable temperature range and the screen temperature, which may be set according to actual needs and is not limited here.

In the step 1032, a red-pixel compensation amount corresponding to the temperature variation amount is queried in a red-pixel compensation amount corresponding relationship corresponding to the gray scale.

In the embodiment of the present disclosure, it is found that temperature variation amounts of the displayed gray scale when the Mini LED screen switches in different ranges are also different, and red-light brightness attenuation of pixel points is also different. Therefore, in the embodiment of the present disclosure, temperature variation amounts and corresponding red-pixel compensation amounts under different gray scales are counted according to experiments on Mini LED screens with different specifications under different gray scales, and a corresponding relationship between the temperature variation amounts and the red-pixel compensation amounts when the screen is switched between different gray scales is established, so as to obtain the red-pixel compensation amount corresponding relationship for the controller to query and use in actual use.

Assuming that a maximum value of a pixel point on a Mini LED screen is expressed as max and an average is expressed as avr, it may be calculated that an average gray scale of the pixel point may be $P=a*max+(1-a)*avr$, for example, when a is 0.6, the average gray scale is $P=0.6*max+0.4*avr$. Of course, a relationship between a gray scale of a screen with different RGB spaces and an output pixel value of a screen pixel point thereof may be different due to its different specifications; and a specific average gray scale calculation formula may be set according to actual needs, which is not limited herein.

For example, in an 8-bit system, the gray scale P ranges from 0 to 255. Usually, a most extreme situation in which the sticking image occurs is that the screen switches from a white block with a gray scale of 255 to a black block with a gray scale of 0. After actual measurement, it is found that when the Mini LED is lit to cause some of the pixel points to display a black block with a gray scale of 0 and rest of the pixel points to display a white block with a gray scale of 255 for more than 1 hour, and then when all of the pixel points are switched to display the white block with the gray scale of 255, the sticking image occurs, and the sticking image between this pixel point and surrounding pixel points may be eliminated by reducing red-pixel values of pixel points at a position of the original black block to 246, and at this time, a maximum compensation range is $C=255-246=9$. In other words, the maximum compensation range of this screen is $C=9$. Through actual measurement, a range of average gray scale is segmented, and corresponding maximum temperature variation amount and maximum red-pixel compensation value are obtained as shown in following table (1):

TABLE 1

| Gray scale Range | Maximum temperature variation amount (° C.) | Maximum Red-pixel compensation Value |
|---|---|---|
| 0-125 | 0.1 | 0 |
| 126-155 | 0.2 | 1 |
| 156-165 | 0.4 | 2 |
| 166-175 | 0.8 | 3 |
| 176-185 | 1 | 4 |
| 186-209 | 1.2 | 5 |
| 210-229 | 1.8 | 6 |
| 230-249 | 2 | 7 |
| 250-254 | 2.2 | 8 |
| 255 | 2.5 | 9 |

Of course, the above is only exemplary description, and a specific red-pixel compensation amount corresponding relationship may be determined according to actual situations of the Mini LED screen in actual use, which is not limited herein.

In the step 1033, the screen is controlled to adjust the red-pixel value of the pixel point according to the red-pixel compensation amount.

In the embodiment of the present disclosure, the controller controls the pixel points in the screen to adjust the red-pixel value according to the red-pixel compensation amount, so as to efficiently eliminate the sticking image of the Mini LED screen caused by the red-light brightness attenuation of the pixel points.

Figure 3:
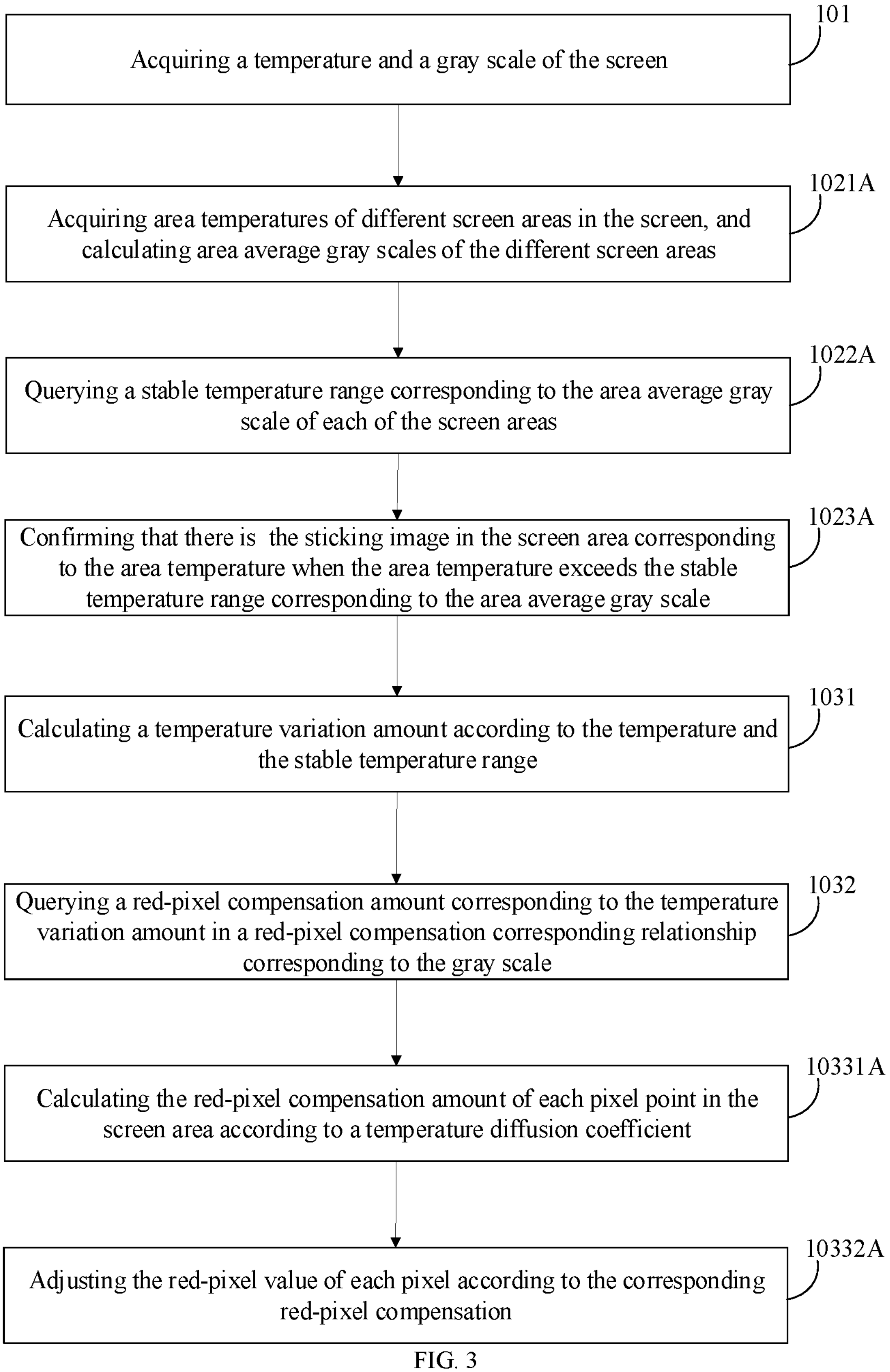
FIG. 3 schematically shows another flow chart of another screen control method according to some embodiments of the present disclosure.

Optionally, referring to FIG. 3, the step 102 includes steps 1021A to 1023A.

In step 1021A, area temperatures of different screen areas in the screen are acquired, and area average gray scales of different screen areas are calculated.

In the embodiment of the present disclosure, the controller can obtain the area temperatures of the screen areas from the temperature sensors arranged in different screen areas in the screen, and calculate an average gray scale of all of the pixel points in each of the different screen areas.

In the step 1022A, a stable temperature range corresponding to the area average gray scale of each of the screen areas is queried.

In the embodiment of the present disclosure, the controller queries the stable temperature range corresponding to the average gray scale from preset stable temperature ranges corresponding to different gray scales.

In the step 1023A, when the area temperature exceeds the stable temperature range corresponding to the area average gray scale, it is confirmed that there is a sticking image in the screen area corresponding to the area temperature.

In the embodiment of the present disclosure, if the area temperature of the screen area exceeds the stable temperature range corresponding to its corresponding average gray scale, it may be determined that there is a situation of red brightness attenuation in the screen area, so as to accurately identify screen areas with sticking image.

Optionally, the temperature includes the area temperatures of the different screen areas in the screen. Referring to FIG. 3, the step 1033 includes following steps 10331A and 10332A.

In the step 10331A, the red-pixel compensation amount of each pixel point in the screen area is calculated according to a temperature diffusion coefficient.

In the embodiment of the present disclosure, the temperature diffusion coefficient is a coefficient for measuring a numerical relationship between an actual temperature of each pixel point or the screen area with a different distance from the temperature sensor in the screen and a temperature measured by the temperature sensor, which may be obtained by measuring and calculating temperatures of areas in the screen with different distances from the temperature sensor using the temperature sensor. For example, a screen of a Mini LED is divided into 9 screen areas of 3×3, and the temperature sensor is disposed in the screen area in a center, so it may be measured that temperature diffusion coefficients corresponding to the screen areas are smaller and smaller in a direction from a middle position to an edge of the screen, and the temperature diffusion coefficient can range from 0 to 1. Of course, the temperature diffusion coefficient of each pixel point in the screen may be further measured, and only an exemplary description is made herein. A specific temperature diffusion coefficient may be measured according to actual needs, which is not limited herein.

Specifically, considering a positive correlation between the red-pixel compensation amount and the temperature, red-pixel compensation amount allocated to each pixel point in the screen area may be calculated according to the temperature diffusion coefficient.

In the step 10332A, the red-pixel value of each pixel point is adjusted according to the corresponding red-pixel compensation amount.

In the embodiment of the present disclosure, the controller adjusts the red-pixel value of each pixel point according to the calculated red-pixel compensation amounts corresponding to different pixel points, so as to keep the red-light brightness of pixel points in the screen area consistent, so as to efficiently eliminate the sticking image caused by red-light brightness attenuation in the Mini LED screen.

Figure 4:
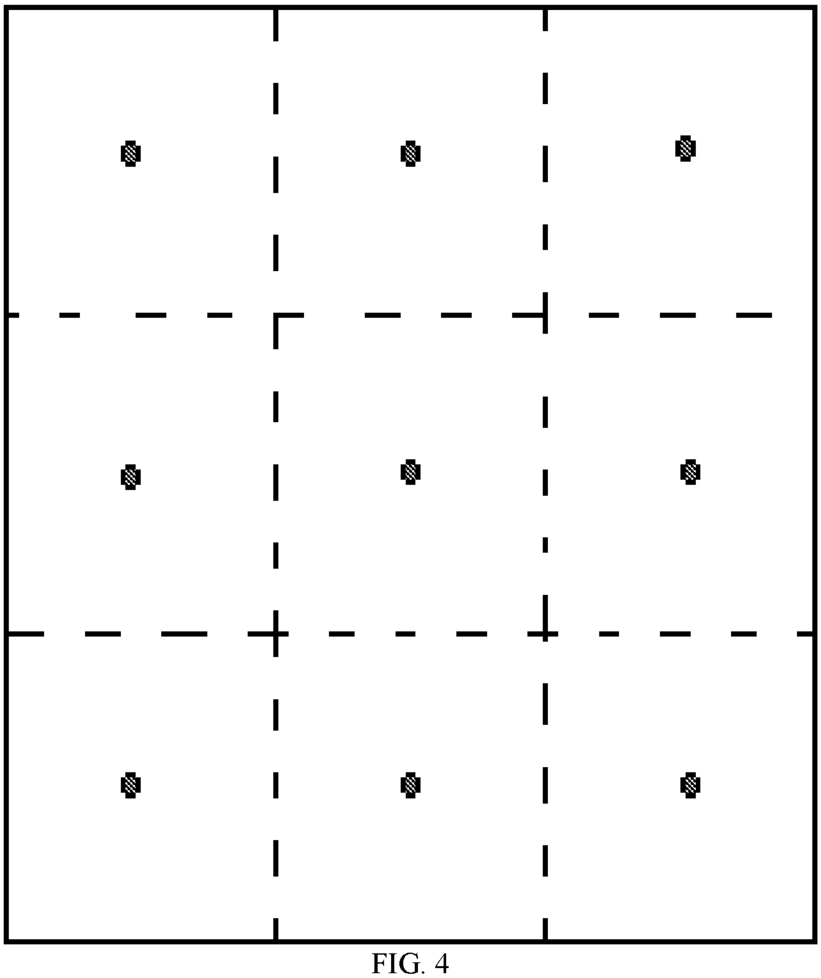
FIG. 4 schematically shows a schematic diagram of a principle of a screen control method according to some embodiments of the present disclosure.

For example, for a spliced screen composed of nine Mini LED screens as shown in FIG. 4, an area temperature of each screen area may be obtained by a temperature sensor indicated by a black dot in a center of each screen area, and an average gray scale of all of the pixel points in each screen area may be counted in real time. For example, if the average gray scale is 255, a maximum red-pixel compensation amount at this gray scale with which it is kept in a steady displaying state is C=9, which corresponds to a stable temperature of 42° C., with 0.2° C. as a threshold, then the stable temperature range may be taken to be from (42−0.2° C.) to (42+0.2° C.) When a temperature measured in a certain screen area is lower than (42−0.2° C.), it is considered that a display picture of the screen area is towards red, and it may be seen that a red-pixel value of the screen area is generally reduced as a whole, because the maximum red-pixel compensation amount at the gray scale of 255 is C=9. According to an actual 3×3 temperature diffusion coefficient, the maximum red-pixel compensation amount is allocated to corresponding pixel points to eliminate sticking image. At this time, when the temperature measured in a certain screen area is higher than (42+0.2° C.), it is considered that a display picture of this screen area is towards blue, and the red-pixel value should be increased as a whole, because the maximum compensation value at the gray scale of 255 is C=9. According to the actual 3×3 temperature diffusion coefficient, the maximum red-pixel compensation amount should be allocated to corresponding pixel points to eliminate sticking image. Of course, this is only an exemplary description. Specifically, the compensation value may be adjusted in real time according to the real-time temperature and the calculated average gray scale, which is not limited herein.

Figure 5:
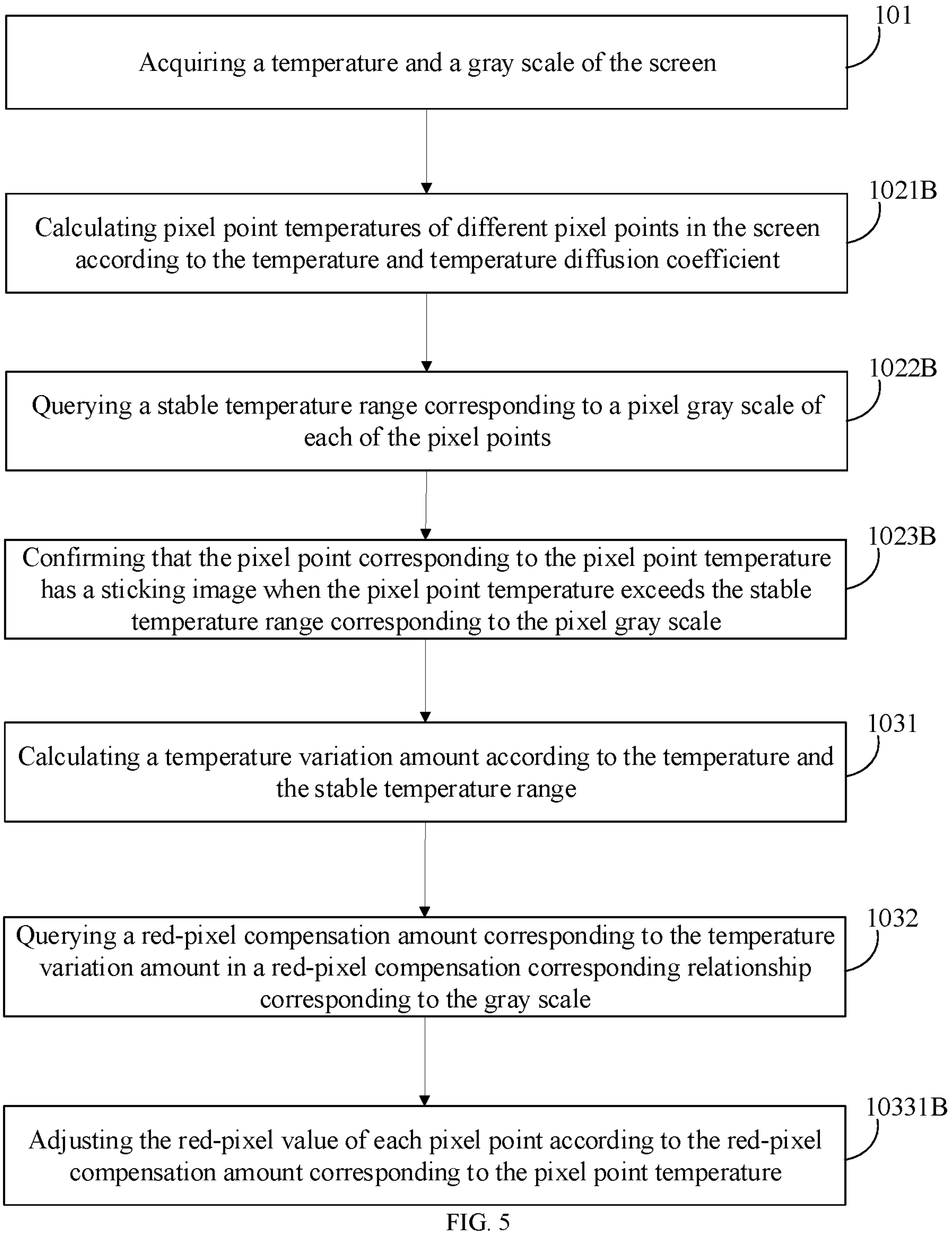
FIG. 5 schematically shows another flow chart of another screen control method according to some embodiments of the present disclosure.

Optionally, referring to FIG. 5, the step 102 includes steps 1021B to 1023B.

In the step 1021B, pixel point temperatures of different pixel points in the screen are calculated according to the temperature and temperature diffusion coefficient.

In the embodiment of the present disclosure, it is similar to the method in FIG. 3, with difference that the temperature diffusion coefficient in the method shown in FIG. 5 is not used to indicate the numerical relationship between different screen areas in the screen and the temperature measured by the temperature sensor, but is used to indicate a numerical relationship between different pixel points in the screen and the temperature measured by the temperature sensor. Therefore, the controller can calculate pixel point temperatures of different pixel points according to the obtained temperature and temperature diffusion coefficient.

In the step 1022B, a stable temperature range corresponding to a pixel gray scale of each of the pixel points is queried.

In the embodiment of the present disclosure, the controller can adaptively query the stable temperature range corresponding to the pixel gray scale of each pixel point, with an acquired temperature being the pixel point temperature.

In the step 1023B, when the pixel point temperature exceeds the stable temperature range corresponding to the pixel gray scale, it is confirmed that the pixel point corresponding to the pixel point temperature has a sticking image.

In the embodiment of the present disclosure, when the pixel point temperature exceeds the stable temperature range corresponding to the gray scale of the corresponding pixel, it may be determined that there is a sticking image in a picture presented by the pixel point and pixel points nearby, so that a position of the pixel point with the sticking image may be accurately identified.

Optionally, referring to FIG. 5, the step 1033 includes step 10331B.

In the step 10331B, the red-pixel value of each pixel point is adjusted according to the red-pixel compensation amount corresponding to the pixel point temperature.

This step may be referred to detailed description of the step 10331B, which will not be repeatedly described here again.

For example, for a splicing screen composed of nine Mini LED screens, the temperature of each screen may be measured in real time, and then a pixel point temperature of each pixel point in the screen may be calculated according to the actual 3×3 temperature diffusion coefficient. Then adjustment may be made according to a gray scale of each pixel point. If a gray scale of a pixel point is 255, the maximum compensation value in a stable state is C=9, which corresponds to a stable temperature of 42° C., with 0.2° C. as a threshold, the stable temperature range may be taken to be from (42−0.2° C.) to (42+0.2° C.) When a current temperature of this pixel point is lower than (42−0.2° C.), it is considered that a picture near this point is towards red and a red-pixel value of this pixel point should be reduced. If it is measured that the current temperature of this pixel point is higher than (42+0.2° C.), it is considered that a picture near this point is towards blue, and the red-pixel value of this pixel point should be increased, and the maximum red-pixel compensation amount is C=9. With a real-time temperature feedback, the pixel may be adjusted in real time. Of course, this is only an exemplary description. Specifically, the compensation value may be adjusted in real time according to the real-time temperature and the calculated average gray scale, which is not limited herein.

Optionally, the temperature diffusion coefficient is obtained by following steps: when the screen includes a plurality of splicing screens, a reference temperature diffusion coefficient is adjusted according to a positional relationship between different splicing screens and a size of a splicing gap so as to obtain a temperature diffusion coefficient of each splicing screen, and the reference temperature diffusion coefficient is a temperature diffusion coefficient when the splicing screens are not spliced.

In some embodiments of the present disclosure, considering that the temperature diffusion coefficient of each screen in the spliced screen is related to a position of the screen in the spliced screen and the size of the splicing gap between the screens, it cannot be used in practical application with the reference temperature diffusion coefficient of a single screen when not spliced. Therefore, in the present disclosure, in actual use, the reference temperature diffusion coefficient is adjusted in advance based on the size of splicing gap between respective screens and the positional relationship between the screens to adaptively obtain the temperature diffusion coefficient of the screen, and of course, it can also be obtained by actually measuring a temperature diffusion coefficient of each screen in the spliced screen during the actual use, which may be set according to actual needs and is not limited herein.

Figure 6:
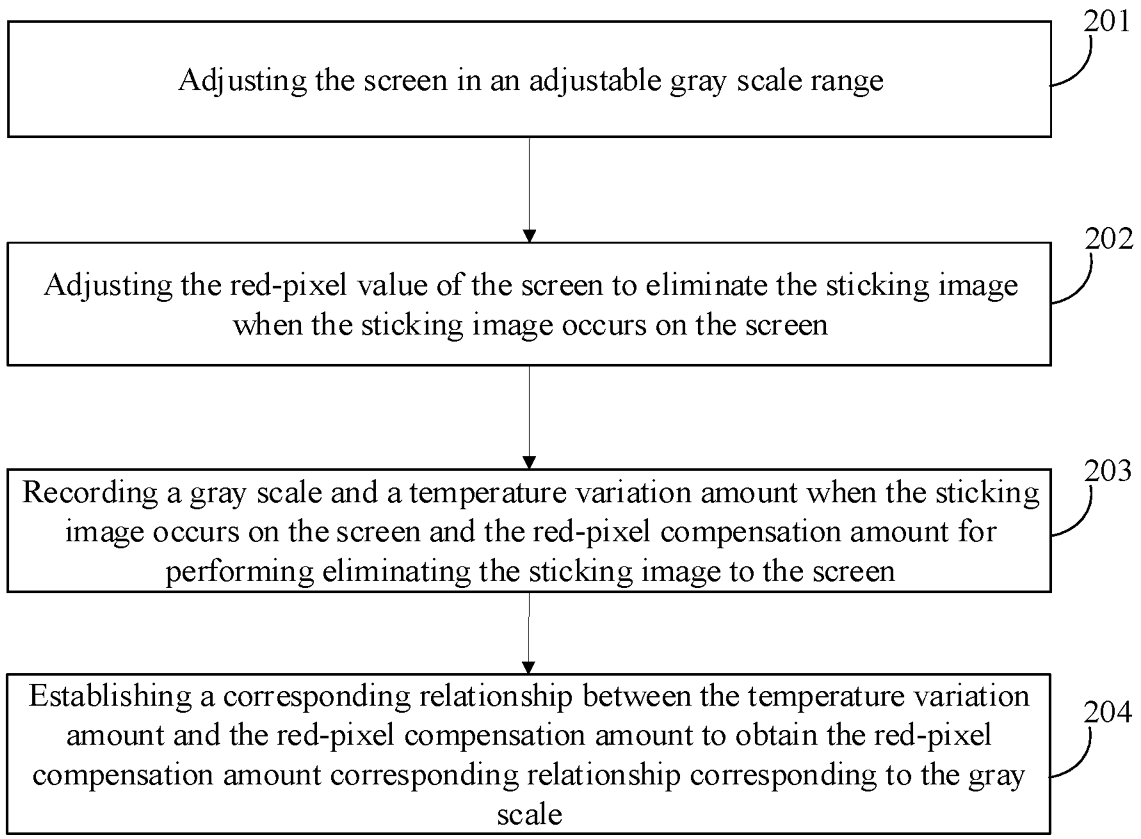
FIG. 6 schematically shows another flow chart of another screen control method according to some embodiments of the present disclosure.

Optionally, referring to FIG. 6, the red-pixel compensation amount corresponding relationship is obtained by following steps 201 to 204.

In the step 201, the screen is adjusted in an adjustable gray scale range.

In the step 202, when sticking image occurs on the screen, the red-pixel value of the screen is adjusted to eliminate the sticking image.

In the step 203, a gray scale and a temperature variation amount when the sticking image occurs on the screen, and the red-pixel compensation amount for performing eliminating the sticking image to the screen are recorded.

In the step 204, a corresponding relationship between the temperature variation amount and the red-pixel compensation amount is established to obtain the red-pixel compensation amount corresponding relationship corresponding to the gray scale.

In some embodiments of the present disclosure, the red-pixel compensation amount corresponding relationship may be obtained as follows: the Mini LED screen is adjusted in advance in the gray-scale adjustable range of 0 to 255, and stable temperatures of pictures of the screen at different gray scales and a temperature when the sticking image occurs on the screen are recorded, and the sticking image is eliminated by adjusting the red-pixel value of the screen and a corresponding red-pixel value compensation amount is recorded, and thus a corresponding relationship between the temperature variation amount and the red-pixel compensation amount at different gray scales may be established in advance, so that the red-pixel value compensation amount for compensating the screen may be conveniently queried when the screen is practically used, and the sticking image in the screen may be effectively eliminated.

A display apparatus provided in the present disclosure includes a display panel and a controller.

The display panel is provided with a temperature sensor for sending a temperature of the display panel to the controller.

The controller is configured for executing the screen control method described above.

The controller in the display apparatus may be referred to relevant description of the controller described above, which is not repeatedly described here again. The temperature sensor on the display panel is communicatively connected with the controller, which can collect the temperature of the display panel in real time and send temperature information to the controller.

According to the embodiment of the present disclosure, it is identified whether there is a sticking image caused by red-light attenuation of pixel points in the screen according to whether a temperature of the Mini LED screen exceeds a stable temperature range corresponding to a displayed gray scale, and the red-light brightness is adjusted by adjusting the red-pixel values of the pixel points in the screen according to the temperature when the temperature of the screen exceeds the stable temperature range, so that the red-light brightness of the pixel points in the screen may be kept uniform so as to eliminate the sticking image in the screen.

Figure 7:
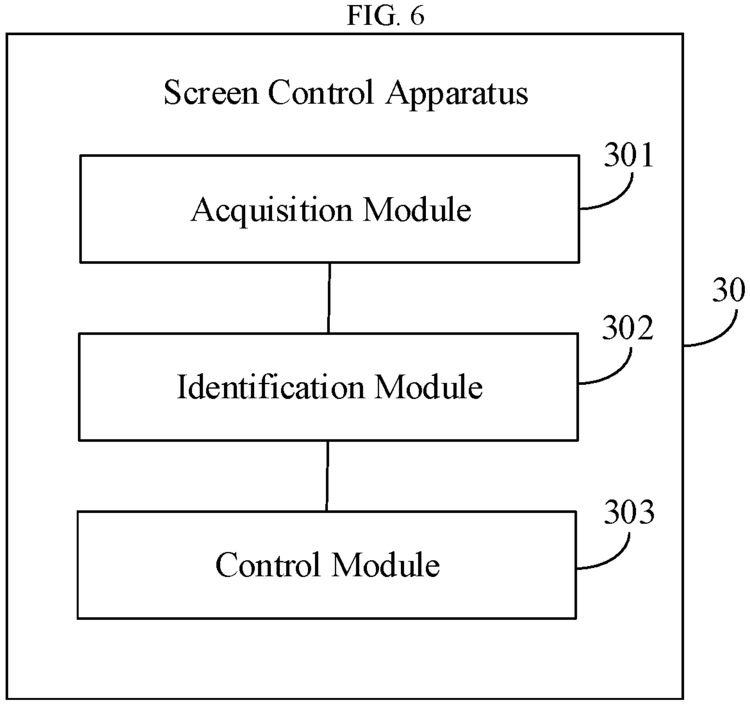
FIG. 7 schematically shows a schematic structural diagram of a screen control apparatus according to some embodiments of the present disclosure.

FIG. 7 schematically shows a structural diagram of a screen control apparatus 30 according to the present disclosure, which is applied to a controller of a Mini LED screen, and the apparatus includes an acquisition module 301, an identification module 302 and a control module 303.

The acquisition module 301 is configured to acquire a temperature and a gray scale of the screen.

The identification module 302 is configured to confirm that there is a sticking image on the screen when the temperature exceeds a stable temperature range corresponding to the gray scale.

The control module 303 is configured to control the screen to adjust a red-pixel value according to the temperature to eliminate the sticking image.

Optionally, the control module 303 is further configured to:

calculate a temperature variation amount according to the temperature and the stable temperature range;

query a red-pixel compensation amount corresponding to the temperature variation amount in a red-pixel compensation amount corresponding relationship corresponding to the gray scale; and control the screen to adjust the red-pixel value of a pixel point according to the red-pixel compensation amount.

Optionally, the temperature includes area temperatures of different screen areas in the screen. The control module 303 is further configured to:

calculate the red-pixel compensation amount of each pixel point in the screen area according to a temperature diffusion coefficient; and adjust the red-pixel value of each pixel point according to the corresponding red-pixel compensation amount.

Optionally, the identification module 302 is further configured to:

acquire area temperatures of different screen areas in the screen, and calculating area average gray scales of the different screen areas;

query a stable temperature range corresponding to the area average gray scale of each of the screen areas; and confirm that there is the sticking image in the screen area corresponding to the area temperature when the area temperature exceeds the stable temperature range corresponding to the area average gray scale.

Optionally, the temperature includes pixel point temperatures of different pixel points in the screen. The control module 303 is further configured to:

adjust the red-pixel value of each pixel point according to the red-pixel compensation amount corresponding to the pixel point temperature.

Optionally, the identification module 302 is further configured to:

calculate pixel point temperatures of different pixel points in the screen according to the temperature and temperature diffusion coefficient;

query a stable temperature range corresponding to a pixel gray scale of each of the pixel points; and confirm that the pixel point corresponding to the pixel point temperature has a sticking image when the pixel point temperature exceeds the stable temperature range corresponding to the pixel gray scale.

Optionally, the red-pixel compensation amount corresponding relationship is obtained by following steps:

adjusting the screen in an adjustable gray scale range;

adjusting the red-pixel value of the screen to eliminate the sticking image when sticking image occurs on the screen;

recording a gray scale and a temperature variation amount when the sticking image occurs on the screen and the red-pixel compensation amount for performing eliminating the sticking image to the screen; and establishing a corresponding relationship between the temperature variation amount and the red-pixel compensation amount to obtain the red-pixel compensation amount corresponding relationship corresponding to the gray scale.

Optionally, the temperature diffusion coefficient is obtained by following steps.

When the screen includes a plurality of splicing screens, a reference temperature diffusion coefficient is adjusted according to a positional relationship between different splicing screens and a size of a splicing gap so as to obtain a temperature diffusion coefficient of each splicing screen, and the reference temperature diffusion coefficient is a temperature diffusion coefficient when the splicing screens are not spliced.

According to the embodiment of the present disclosure, it is identified whether there is a sticking image caused by red-light attenuation of pixel points in the screen according to whether a temperature of the Mini LED screen exceeds a stable temperature range corresponding to a displayed gray scale, and the red-light brightness is adjusted by adjusting the red-pixel values of the pixel points in the screen according to the temperature when the temperature of the screen exceeds the stable temperature range, so that the red-light brightness of the pixel points in the screen may be kept uniform so as to eliminate the sticking image in the screen.

The embodiments of each component in the present disclosure may be implemented by hardware, or by software modules running on one or more processors, or by their combination. A person skilled in the art should understand that the microprocessor or digital signal processor (DSP) may be used in practice to realize some or all functions of some or all components in the calculation and processing equipment according to the embodiments of the present disclosure the present disclosure. The present disclosure may also be implemented as the equipment or device programs (for example, computer programs and computer program products) used to execute part or all of the methods described here. The programs of implementing the present disclosure may be stored in a computer-readable medium, or can have the form of one or more signals. Such signals may be downloaded from the Internet site, or disposed on the carrier signal, or provided in any other form.

Figure 8:
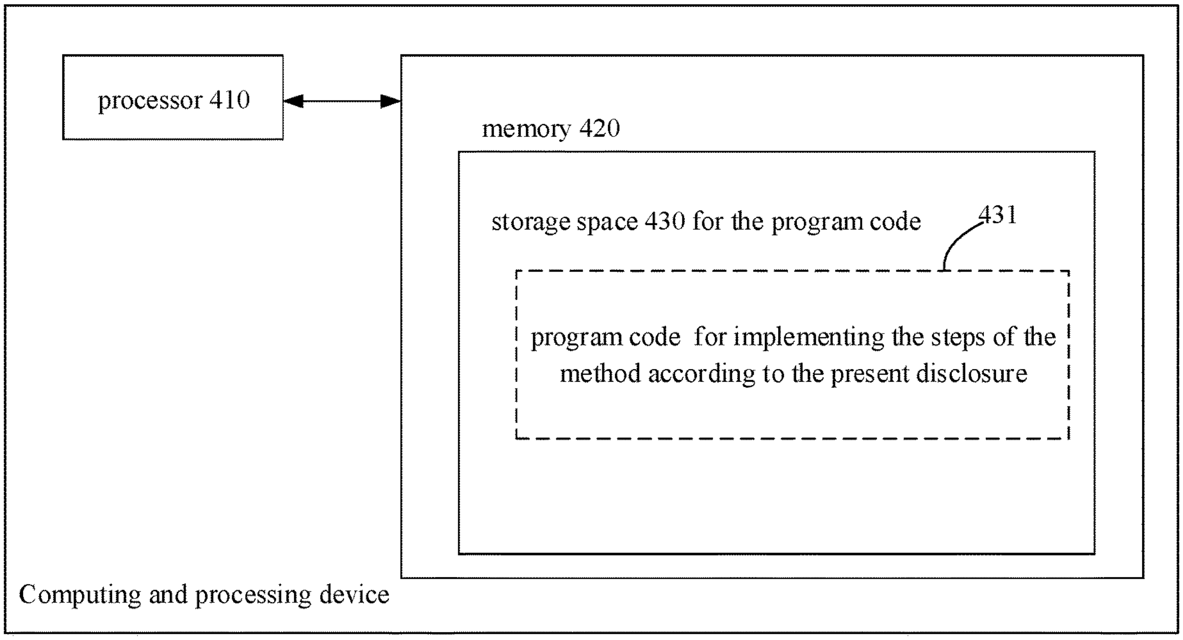
FIG. 8 schematically shows a block diagram of a computing processing device for executing the method according to some embodiments of the present disclosure.
Figure 9:
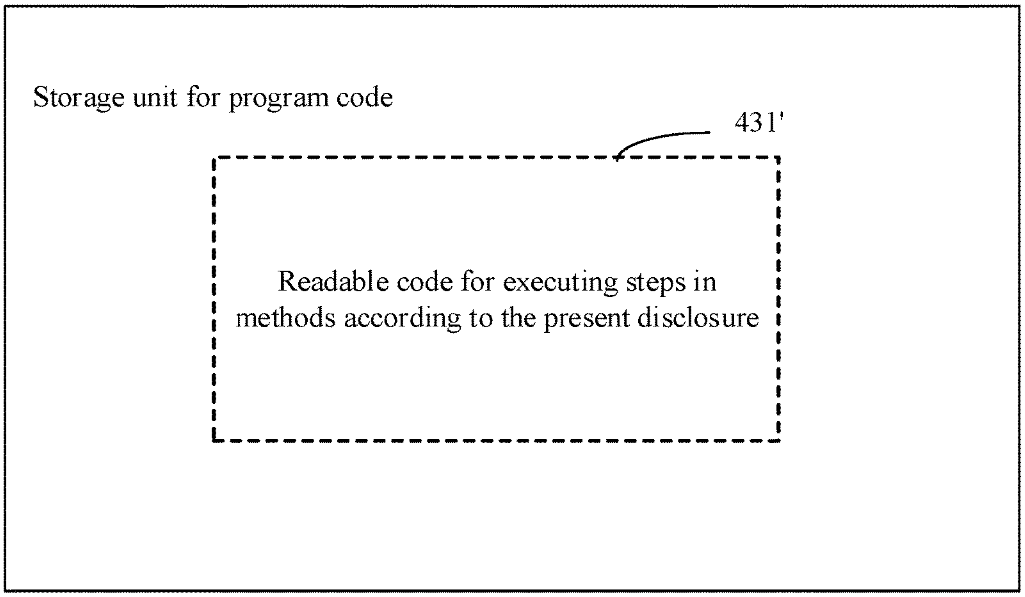
FIG. 9 schematically shows a storage unit for holding or carrying program codes for implementing the method according to some embodiments of the present disclosure.

For example, FIG. 8 shows a calculating and processing device that can implement the method according to the present disclosure. The calculating and processing device traditionally includes a processor 410 and a computer program product or computer-readable medium in the form of a memory 420. The memory 420 may be electronic memories such as flash memory, EEPROM (Electrically Erasable Programmable Read Only Memory), EPROM, hard disk or ROM. The memory 420 has the storage space 430 of the program code 431 for implementing any steps of the above method. For example, the storage space 430 for program code may contain program codes 431 for individually implementing each of the steps of the above method. Those program codes may be read from one or more computer program products or be written into the one or more computer program products. Those computer program products include program code carriers such as a hard disk, a compact disk (CD), a memory card or a floppy disk. Such computer program products are usually portable or fixed storage units as shown in FIG. 9. The storage unit may have storage segments or storage spaces with similar arrangement to the memory 420 of the calculating and processing device in FIG. 8. The program codes may, for example, be compressed in a suitable form. Generally, the storage unit contains a computer-readable code 431', which may be read by a processor like 410. When those codes are executed by the calculating and processing device, the codes cause the calculating and processing device to implement each of the steps of the method described above.

It should be understood that although the steps in the flow chart of the figures are displayed in turn according to the instructions of the arrows, these steps are not necessarily performed in the order indicated by the arrows. Unless this article makes it clear that there are no strict order restrictions on the execution of these steps, they may be executed in other order. Moreover, at least part of the steps in the flow chart can include multiple sub-steps or multiple stages. These sub-steps or stages are not necessarily completed at the same time, but may be executed at different times. The order of execution is not necessarily sequential, but may be performed by taking turns or alternately with at least part of sub-steps of other steps or stages of other steps.

Reference herein to "one embodiment," "an embodiment," or "one or more embodiments" means that a particular feature, structure, or characteristic described in connection with an embodiment is included in at least one embodiment of the present disclosure. Also, please note that instances of the phrase "in one embodiment" herein are not necessarily all referring to the same embodiment.

In the specification provided herein, numerous specific details are set forth. It will be understood, however, that the embodiments of the present disclosure may be practiced without these specific details. In some instances, wellknown methods, structures, and techniques have not been shown in detail in order not to obscure an understanding of this specification.

In the claims, any reference signs between parentheses should not be construed as limiting the claims. The word "include" does not exclude elements or steps that are not listed in the claims. The word "a" or "an" preceding an element does not exclude the existing of a plurality of such elements. The present application may be implemented by means of hardware including several different elements and by means of a properly programmed computer. In unit claims that list several devices, some of those devices may be embodied by the same item of hardware. The words first, second, third and so on do not denote any order. Those words may be interpreted as names.

Finally, it should be noted that the above embodiments are only intended to illustrate technical schemes of the present disclosure, but not to limit it. Although the present disclosure has been described in detail with reference to the foregoing embodiments, it should be understood by ordinary skilled in the art that modifications may be made to the technical schemes described in the foregoing embodiments, or equivalent substitutions may be made to some technical features thereof. These modifications or substitutions do not make essence of corresponding technical schemes depart from the spirit and scope of the technical schemes of the embodiments of the present disclosure.

The invention claimed is:

1. A screen control method applied to a controller of a Mini LED screen, comprising:
- acquiring a temperature and a gray scale of the Mini LED screen;
- confirming that there is a sticking image on the Mini LED screen when the temperature exceeds a stable temperature range corresponding to the gray scale; and
- controlling the Mini LED screen to adjust a red-pixel value according to the temperature to eliminate the sticking image, wherein
- the controlling of the Mini LED screen to adjust the red-pixel value according to the temperature comprises:
  - calculating a temperature variation amount according to the temperature and the stable temperature range corresponding to the gray scale;
  - querying a red-pixel compensation amount corresponding to a temperature variation amount in a red-pixel compensation amount corresponding relationship corresponding to the gray scale; and
  - controlling the Mini LED screen to adjust a red-pixel value of a pixel point according to the red-pixel compensation amount;
- the temperature comprises area temperatures of different screen areas in the Mini LED screen, and
- the controlling of the Mini LED screen to adjust the red-pixel value of the pixel point according to the red-pixel compensation amount comprises:
  - calculating a red-pixel compensation amount of each pixel point in a screen area according to a temperature diffusion coefficient; and
  - adjusting a red-pixel value of the each pixel point according to the corresponding red-pixel compensation amount.

2. The method according to claim 1, wherein the confirming that there is the sticking image on the Mini LED screen when the temperature exceeds the stable temperature range corresponding to the gray scale comprises:
- acquiring the area temperatures of the different screen areas in the Mini LED screen, and calculating area average gray scales of the different screen areas;
- querying a stable temperature range corresponding to an area average gray scale of each of the screen areas; and
- confirming that there is a sticking image in a screen area corresponding to an area temperature when the area temperature exceeds the stable temperature range corresponding to the area average gray scale.

3. The method according to claim 1, wherein the red-pixel compensation amount corresponding relationship is obtained by following steps:
- adjusting the Mini LED screen in an adjustable gray scale range;
- adjusting the red-pixel value of the Mini LED screen to eliminate the sticking image when sticking image occurs on the Mini LED screen;
- recording a gray scale and a temperature variation amount when the sticking image occurs on the Mini LED screen and the red-pixel compensation amount for performing eliminating the sticking image to the Mini LED screen; and
- establishing a corresponding relationship between the temperature variation amount and the red-pixel compensation amount to obtain the red-pixel compensation amount corresponding relationship corresponding to the gray scale.

4. The method according to claim 1, wherein the temperature diffusion coefficient is obtained by following steps:
- when the Mini LED screen comprises a plurality of splicing screens, a reference temperature diffusion coefficient is adjusted according to a positional relationship between different splicing screens and a size of a splicing gap so as to obtain a temperature diffusion coefficient of each splicing screen, and the reference temperature diffusion coefficient is a temperature diffusion coefficient when the splicing screens are not spliced.

5. A display apparatus, comprising: a display panel and a controller;
- wherein the display panel is provided with a temperature sensor, and the temperature sensor is configured for sending a temperature of the display panel to the controller; and
- the controller is configured for executing the screen control method according to claim 1.

6. The display apparatus according to claim 5, wherein the confirming that there is the sticking image on the Mini LED screen when the temperature exceeds the stable temperature range corresponding to the gray scale comprises:
- acquiring area temperatures of different screen areas in the Mini LED screen, and calculating area average gray scales of the different screen areas;
- querying a stable temperature range corresponding to the area average gray scale of each of the screen areas; and
- confirming that there is the sticking image in the screen area corresponding to the area temperature when the area temperature exceeds the stable temperature range corresponding to the area average gray scale.

7. The display apparatus according to claim 5, wherein the red-pixel compensation amount corresponding relationship is obtained by following operations:
- adjusting the Mini LED screen in an adjustable gray scale range;
- adjusting the red-pixel value of the Mini LED screen to eliminate the sticking image when sticking image occurs on the Mini LED screen;

recording a gray scale and a temperature variation amount when the sticking image occurs on the Mini LED screen and the red-pixel compensation amount for performing eliminating the sticking image to the Mini LED screen; and establishing a corresponding relationship between the temperature variation amount and the red-pixel compensation amount to obtain the red-pixel compensation amount corresponding relationship corresponding to the gray scale.

8. The display apparatus according to claim 5, wherein the temperature diffusion coefficient is obtained by following operations:

when the Mini LED screen comprises a plurality of splicing screens, a reference temperature diffusion coefficient is adjusted according to a positional relationship between different splicing screens and a size of a splicing gap so as to obtain a temperature diffusion coefficient of each splicing screen, and the reference temperature diffusion coefficient is a temperature diffusion coefficient when the splicing screens are not spliced.

9. A computing processing device, comprising:

a memory with a computer-readable code stored therein;

one or more processors, the computing processing device executing the screen control method according to claim 1 when the computer-readable code is executed by the one or more processors.

10. A non-transitory computer-readable medium with a computer program of the screen control method according to claim 1 stored therein.

11. A screen control method applied to a controller of a Mini LED screen, comprising:

acquiring a temperature and a gray scale of the Mini LED screen;

confirming that there is a sticking image on the Mini LED screen when the temperature exceeds a stable temperature range corresponding to the gray scale; and controlling the Mini LED screen to adjust a red-pixel value according to the temperature to eliminate the sticking image;

controlling the Mini LED screen to adjust the red-pixel value according to the temperature comprises:

calculating a temperature variation amount according to the temperature and the stable temperature range corresponding to the gray scale;

querying a red-pixel compensation amount corresponding to a temperature variation amount in a red-pixel compensation amount corresponding relationship corresponding to the gray scale; and controlling the Mini LED screen to adjust a red-pixel value of a pixel point according to the red-pixel compensation amount, wherein the temperature comprises pixel point temperatures of different pixel points in the Mini LED screen, the controlling of the Mini LED screen to adjust the red-pixel value of the pixel point according to the red-pixel compensation amount comprises adjusting a red-pixel value of each pixel point according to a red-pixel compensation amount corresponding to a pixel point temperature of the each pixel point, and the confirming that there is the sticking image on the Mini LED screen when the temperature exceeds the stable temperature range corresponding to the gray scale comprises:

calculating the pixel point temperatures of the different pixel points in the Mini LED screen according to the temperature and a temperature diffusion coefficient;

querying a stable temperature range corresponding to a pixel gray scale of each of the pixel points; and confirming that a pixel point corresponding to a pixel point temperature has a sticking image when the pixel point temperature exceeds the stable temperature range corresponding to a pixel gray scale of the pixel point corresponding to the pixel point temperature.

12. A display apparatus, comprising a display panel and a controller, wherein the display panel is provided with a temperature sensor, and the temperature sensor is configured for sending a temperature of the display panel to the controller, and the controller is configured for executing the screen control method according to claim 11.

* * * * *